June 18, 1957 W. A. REENSTRA 2,796,465
LINE CIRCUIT
Filed May 6, 1954
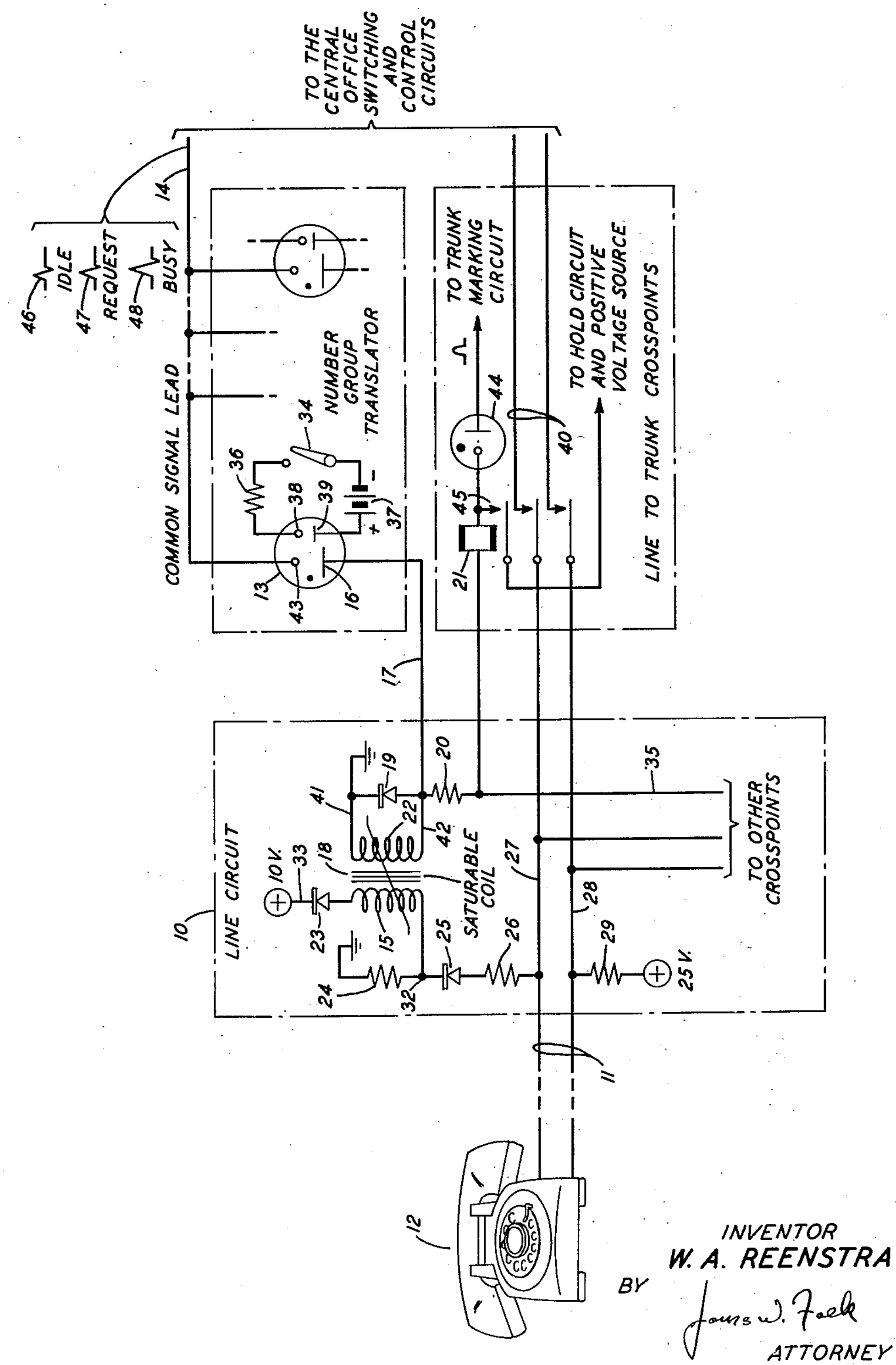
INVENTOR
W. A. REENSTRA
BY
[signature]
ATTORNEY United States Patent Office 2,796,465

Patented June 18, 1957

2,796,465

LINE CIRCUIT

Willard A. Reenstra, Rutherford, N. J., assignor to Bell Telephone Laboratories, Incorporated, New York, N. Y., a corporation of New York Application May 6, 1954, Serial No. 427,965

7 Claims. (Cl. 179—18)

This invention relates to electrical signaling devices for transmitting indications of the condition of a plurality of lines or terminals and, more particularly to such a device in a telephone system for signaling the service condition of a number of subscriber lines at a remote line concentrator which is connected to a central office by a smaller number of trunks.

In Patent 2,724,744, issued November 22, 1955, of S. T. Brewer, W. A. Reenstra and W. J. Ritchie, there is disclosed a telephone system wherein a number of telephone subscribers remotely located from a central office share a smaller number of common trunks for independent connection to the central office, thereby effecting considerable savings in the cost of operation of the telephone plant. These savings are realized by the interposition of a concentrating switch between the central office and the group of telephone subscribers. This switch, which preferably is located remote from the central office and adjacent the subscribers advantageously is comprised of a plurality of crosspoints which are selectively operated to effect the desired connections between the trunks and the subscriber lines. As the central office is not directly in information communication with the subscriber lines due to the interposition of the remote line concentrator, it is generally necessary that some means be provided to inform the central office of the service condition of any of the subscriber lines when such information is needed by the central office. The line service conditions to be determined may be classified into three types, which are the idle or on-hook condition, in which thereis no connection through the concentrator switch to the central office, the busy condition, in which the subset is off-hook and is connected through the switch to the central office, and the service request condition, in which the subset is also off-hook but is not connected through the switch to the central office.

In non-concentrator telephone systems, the subscriber lines terminate directly in a central office and contacts on the line and cutoff relays are used to determine which of these three line conditions exists. It is an object of this invention to eliminate these line and cutoff relays by signaling indications of the service condition of any of the subscriber lines at the remote concentrator over a common signaling lead extending to the central office.

It is a general object of this invention to provide an improved electrical circuit for generating signals indicative of the condition of a plurality of lines.

More specifically, it is an object of this invention to provide in a telephone system an improved electrical signaling circuit for generating indications of the idle, busy and service request conditions of a plurality of subscriber lines located at a point remote from a central office.

In one specific illustrative embodiment of the invention, disclosed herein, there is shown a variable impedance comprising a saturable core reactor in series with the anode of a line number group tube. The current flow through the latter tube is determined by the impedance of the saturable core reactor which changes with the conditions of the subscriber's line and crosspoints associated therewith. The line circuit is comprised of a voltage divider which includes the series connected combination of a potential source, a fixed impedance, the subscriber loop resistance, the saturable core reactor circuit, which includes a diode connected between the control winding and a source of potential, and the line number group tube. In shunt with the saturable core reactor are the crosspoints associated with the subscriber line. In either the idle line or service request line conditions, none of the line's crosspoints are operated. The distinction between these two conditions therefore is made on the basis of the state of the switchhook at the subscriber's instrument. In the on-hook or idle position the resistance across the subscriber's loop is high, the only current path being that due to line leakage. The potential on the diode biases it to the non-conducting state and prevents current from flowing through the control winding of the saturable reactor. The impedance that the winding presents to the anode of the line number tube in this condition is high, resulting in a relatively small output current when the tube is triggered.

In the off-hook service requesting condition of the line, the resistance across the subscriber's loop is low. The diode is no longer back biased and conducts sufficient current to saturate the core. The impedance presented to the line number group tube is therefore lower and a larger current pulse is present at the output to indicate a request condition.

In the busy line condition a crosspoint is operated to connect a line to a trunk. The holding current for the crosspoint is diverted in part through the line number group tube during tube conductions. Thus, the impedance presented to the anode of the tube is the smallest for the busy condition and the current at the output is larger than that produced by either of the other two conditions.

It is a feature of this invention that the impedance of a saturable core reactor circuit be determined by the idle, busy and service requesting conditions of a subscriber line in a telephone system.

More specifically it is a feature of this invention that a saturable core reactor have no current through its control winding during the idle condition of a line to present a large impedance to the output circuit, sufficient current through the control winding to saturate the core during the service request condition to present a smaller impedance to the output circuit, and a conducting crosspoint in shunt therewith during the busy condition to present a still smaller impedance to the output circuit to thereby enable the service condition of the line to be determined by the magnitude of the current flowing through the output circuit.

These and other features of the invention, its construction, and its mode of operation will be apparent from the following description and the accompanying drawing which shows a specific illustrative embodiment thereof. While this invention is described with reference to telephone systems and more particularly with reference to a telephone system of the type described in the above-mentioned application, it is to be understood that our novel system is not to be considered limited to telephone applications alone, as it is readily applicable to other systems where it is desirable to provide remote indications of the condition of a line such as in the fields of telegraphy, information processing system, telemetering and the like.

Referring now to the drawing, the reference numeral 10 indicates a line circuit connected to a subscriber line 11 and a subset 12. The operation of the invention will be described in terms of the operation of a single line circuit connected to a single subscriber line. It is understood that in a complete telephone system, such as that described in the above-mentioned Brewer-Reenstra-Ritchie patent with which the inventive line circuit may advantageously be employed, a large number of such subsets 12, subscriber lines 11 and line circuits 10 would be employed so that indications of the service condition of each line may be transmitted by the line circuits 10 over a common lead 14 to the central office to be detected by a request busy detector such as that disclosed in the above-mentioned Brewer-Reenstra-Ritchie patent and in Patent 2,724,745, issued November 22, 1955, of S. T. Brewer. In such a system there is a line number group tube 13 connected to each line circuit, which, when operated, provides the testing pulse necessary to determine the condition of the line. As will be further explained below the line circuit acts as a variable reactance, the impedance of which is determined by the service condition of the line, and controls the amplitude of the current pulse flowing through the main gap of line number group tube 13 from the common signal lead 14 to provide a distant indication of the line condition.

The central element of the line circuit 10 is a saturable core reactor 18, the secondary winding 22 of which is connected at one end 42 to the main anode 16 of the line number group tube 13 through a lead 17. The winding 22 has a diode 19 connected thereacross and is connected at the other end 41 to ground. At the junction of lead 17 and the diode 19 the winding is connected through a resistor 20 to the crosspoint relay coil 21 and all of the other crosspoint relays, one for each trunk 40, of the same vertical appearance by the lead 35. The control winding 15 of the saturable core reactor 18 is connected at one end to a source of a positive potential of 10 volts through a diode 23. The other end of the winding is connected through a resistor 24 to ground and through a diode 25 and a resistor 26 to one conductor 27 of the subscriber loop 11. The other conductor 28 of the subscriber loop 11 is connected through a resistor 29 to a source of a positive potential of 25 volts.

The line number group tube 13, which advantageously may be a multielement gas tube of the Western Electric 425 A type, has its main anode connected to the junction of resistor 20, diode 19, and lead 42 of the saturable core winding 22, as previously pointed out. The main cathode 43 of the tube 13 is connected to the common signal lead 14 which extends to the central office. The main cathode of each of the remaining line number group tubes in the number group translator are similarly connected to the signal lead 14 over which the line condition signals are transmitted. The starter cathode 38 of the line number group tube 13 is connected through a resistance 36 to a source of starting pulses, here shown as a switch 34 and a source of potential 37, which is returned to the starter anode 39 to complete the starter circuit. The starting pulse source manifestly may comprise any arrangement for supplying starting potentials to the starter electrodes and in the complete telephone system described in the aforementioned Brewer-Reenstra-Ritchie patent advantageously would be controlled by the central office to test the condition of selected subscriber lines.

The crosspoint relay 21 is connected to the cathode of a cold cathode diode 44 and to the hold contacts 45. The anode of the diode 44 is connected to a source of trunk marking potential.

As previously pointed out the impedance of each line circuit varies in accordance with the service condition of the subscriber line. These line service conditions may be tabulated as follows:

*Table I*

| Condition | Subset | Line to Trunk Crosspoint |
|---|---|---|
| 1. Idle line | On-Hook | Not Operated. |
| 2. Busy line | On-Hook or Off-Hook. | Operated. |
| 3. Service Requesting Line | Off-Hook | Not Operated. |

At the idle and service request line conditions, there is no connection through the concentrator, so in either case, none of the crosspoints of the line to be tested is operated. Hence, the distinction between an idle and a request line must be made on the basis of the state of the switch hook at the subscriber's instrument. In the off-hook or service requesting position the resistance across the subscriber's loop is low, approximately 62 ohms plus the loop resistance. With the receiver in the on-hook or idle position, this resistance is high. Under this condition the only current path is that due to line leakage which has a lower limit of 10,000 ohms. By using the loop resistance as a series element in a voltage divider comprised of resistor 24, diode 25, resistor 26, the loop resistance and resistor 29, point 32 of the line circuit 10 will take on the following voltage values with respect to ground for various subset conditions of the specific illustrative embodiment of the invention:

*Table II*

| Line Condition | Maximum (10,000 Ohm Line Leak Case) | Minimum |
|---|---|---|
| 1. Idle | 9.6 volts | 0. |
| 2. Service Requesting | 12 volts | 11.8 volts (assuming 600 ohm loops). |

With the above values for the voltage at point 32 of the drawing and a positive 10 volt bias on the diode 23 no current will normally flow through the control winding of the saturable core reactor 18 when the line 11 for the subset 12 is idle. The impedance in the anode 16 of the line number group tube 13 is then the back impedance of the diode 19 in parallel with the high impedance of the saturable coil winding. The current drawn from the supply circuit of the central office when tube 13 is triggered will be limited by this high impedance and a pulse of small magnitude 46 will be produced on lead 14 to indicate an idle line.

In the off-hook or service request condition, the diode 23 is no longer backbiased due to the 12 volt potential at point 32 and the current which then flows through the primary winding of the saturable coil 18, diode 23, and the lead 33 is sufficient to saturate the core of the reactor 18. As a result, the impedance presented to the line number group tube 13 is lower and more current will be drawn from the supply circuit at the central office when tube 13 is triggered by the operation of the switch 34 to produce a larger pulse 47 to identify the line of the subset 12 as a requesting line.

The remaining condition to be detected is that of a busy line. This condition differs from the two discussed above in that a crosspoint is operated from the line to a trunk. The holding current for the crosspoint relay 21 normally flows from ground through the diode 19 at the saturable core reactor circuit. This current is diverted through the number group tube 13 via the lead 17, when the latter tube conducts to produce a current change in the supply circuit. When the line is in the busy condition this current change is larger than the changes produced by either of the other two conditions. A pulse 48 is consequently produced on the lead 14 to identify the subscriber line 11 as a busy line.

The variations in current change among the three possible conditions form the basis of the identification of the condition of the line being tested by the detector at the central office as has now been shown. During the busy condition, the talking battery, which is placed on a conductor of the subscriber's loop, backbiases the diode 25 which connects to point 32 so that the subscriber's loop produces no current in the control winding of the saturable core reactor 18. This causes the impedance of the reactor to be high, restoring it to the idle line condition while the line is bsuy, thereby removing the signal current from the 10 volt bias lead 33.

Thus, I have shown and described a specific illustrative embodiment of a novel electrical signaling device for transmitting indications of the condition of a line from a point remotely located from the receiver, such as a remote line concentrator in a telephone system. It is to be understood that the above-described arrangements are but illustrative of the application of the principles of this invention. Numerous other arrangements may be made by those skilled in the art without departing from the spirit and scope of the invention.

What is claimed is:

1. A line circuit for signaling the idle, busy, or service requesting condition of a subscriber line in a telephone system, comprising a telephone, a line comprising a pair of wires connected to said telephone, a voltage dividing network connected to said line comprising a first impedance connected to one wire of said pair and a second impedance connected to the other wire of said pair, said second impedance including a saturable core reactor having a plurality of windings, and a gaseous discharge device connected to one of said windings of said saturable core reactor, whereby the idle, busy, or service requesting condition of the line determines the impedance of the saturable core reactor and controls the magnitude of the current through said gaseous discharge tube to thereby provide a signal indicative of the service condition of said line.

2. A circuit for signaling the idle, busy, or service requesting condition of a line in a telephone system comprising, a telephone, a line comprising a pair of wires connected to said telephone, a first source of potential, a fixed impedance connected between said first source of potential and one of said pair of wires, a second source of potential, a variable impedance connected between the other of said pair of wires and said second source of potential, and a signaling lead connected in series with said variable impedance, means to cause the impedance presented to the signaling lead to be highest when said line is in the idle condition, means to cause the impedance presented to the signaling lead to be intermediate when said line is in the service requesting condition, and means to cause the impedance presented to the signaling lead to be lowest when said line is in the busy condition whereby the current flow through said line is indicative of the service condition of the line.

3. A signaling circuit in accordance with claim 2 wherein said variable impedance comprises a saturable core reactor.

4. An electrical circuit for signaling the condition of a subscriber line in a telephone system comprising a telephone, a subscriber line having a pair of leads connected to said telephone, a variable impedance connected to one of said leads, a first source of potential, a normally non-conducting diode connected between said variable impedance and said first source of potential, crosspoint switch means connected to said variable impedance, a second source of potential, a fixed impedance connected between the other of said leads and said second source of potential, and an output circuit connected to said variable impedance for transmitting current indications of the condition of the subscriber line whereby the value of said variable impedance is determined by the operating states of said telephone, said normally non-conducting diode, and said crosspoint switch means.

5. A line circuit for signaling the idle, busy, or service requesting condition of a subscriber line in a telephone system comprising a gaseous discharge device having a starter anode, a starter cathode, a main anode and a main cathode, an output signal lead connected to said main cathode, a variable impedance connected to said main anode, said variable impedance comprising a saturable core reactor, normally open telephone switch means connected to said variable impedance, normally open crosspoint switch means connected to said variable impedance, means responsive to the open condition of each of said telephone switch means and said crosspoint switch means to prevent current from flowing in said saturable core reactor whereby said reactor presents a high impedance to said discharge device to indicate an idle line condition, means responsive to the closed condition of said telephone switch means and the open condition of said crosspoint switch means to permit current to flow through said saturable core reactor sufficient to saturate the core whereby the reactor presents a lower impedance to said discharge device to indicate a service requesting line condition, and means responsive to the closed condition of said crosspoint switch means to provide a low impedance shunt for said saturable core reactor whereby the reactor presents a still lower impedance to said discharge device to indicate a busy line condition of said subscriber line.

6. A variable impedance circuit comprising a first potential source, a normally open switch having a pair of contacts, a fixed impedance connected between said first potential source and one of said pair of contacts, a second potential source, a saturable core reactor connected to said second potential source, a normally non-conducting diode connected between the other of said pair of contacts and said saturable core reactor, means controlled by said switch in its open position to bias said diode in its non-conducting state to prevent current from flowing through said saturable core reactor whereby said reactor presents a relatively high impedance, and means controlled by said switch in its closed position to cause said diode to conduct and pass a current sufficient to saturate said reactor whereby a relatively low impedance is presented.

7. A line circuit in a remote line concentrator telephone system comprising a saturable core reactor, a first potential source, a subscriber line having a pair of leads, means to connect one lead thereof to said first potential source, means to connect the other lead of said pair to said saturable core reactor, said means including a normally non-conducting diode, a second potential source connected to said saturable core reactor, means controlled by the idle condition of the subscriber line to maintain the diode in the non-conducting state whereby no current flows through said reactor, and means controlled by the service requesting condition of the subscriber line to cause said diode to conduct and permit sufficient current to flow therethrough to saturate said saturable core reactor.

No references cited.